United States Patent [19]
Schmitz et al.

[11] 3,823,605
[45] July 16, 1974

[54] METHOD AND APPARATUS FOR TESTING TUBES DURING SIZING BY A MECHANICAL EXPANDER

[75] Inventors: Helmut Schmitz, Wittlaer; Detlef Ramdohr, Krefeld-Traar, both of Germany

[73] Assignee: Mannesmannrohren-Werke Aktiengesellschaft, Dusseldorf, Germany

[22] Filed: Dec. 7, 1972

[21] Appl. No.: 311,708

[30] Foreign Application Priority Data
Dec. 10, 1971  Germany............................ 2162029

[52] U.S. Cl.................................... 73/89, 73/100
[51] Int. Cl. ........................................... G01b 5/30
[58] Field of Search ........ 73/88 R, 89, 100; 72/393, 72/19

[56] References Cited
UNITED STATES PATENTS

| 1,610,796 | 12/1926 | King............................. 72/393 |
| 2,672,175 | 3/1954 | Howard ............................ 72/393 |
| 2,721,109 | 10/1955 | Ross..................................... 73/89 |
| 3,201,977 | 8/1965 | Kutsay ............................ 73/88.5 R |

FOREIGN PATENTS OR APPLICATIONS
221,381   1968   U.S.S.R............................... 73/100

Primary Examiner—James J. Gill
Assistant Examiner—Anthony V. Ciarlante
Attorney, Agent, or Firm—Ralf H. Siegemund

[57] ABSTRACT

The grade of tubing is checked during tube expansion for sizing in that the axial displacement of a wedge action, segment spreading expanding tool is plotted against strain gauged deformation of one of the radially spread segments.

7 Claims, 1 Drawing Figure

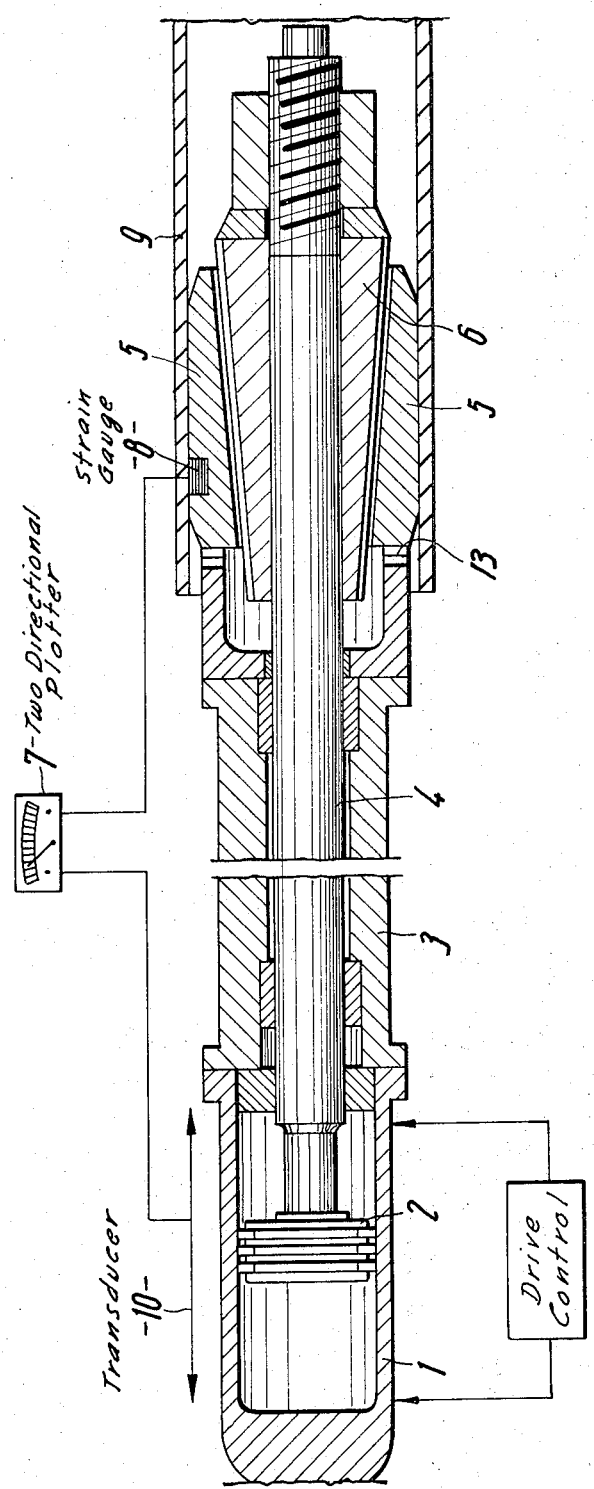

METHOD AND APPARATUS FOR TESTING TUBES DURING SIZING BY A MECHANICAL EXPANDER

BACKGROUND OF THE INVENTION

The present invention relates to method and apparatus for calibrating, sizing and testing of tubes by means of mechanical tube expanders.

Longitudinally welded pipes and tubes, e.g., of diameter in excess of about 400 mm (about 15 inches) are usually sized by expanding such pipes and tubes by about 1 percent. This sizing and calibrating process is usually carried out by means of a mechanical tube expander having a pyramid-shaped cam, and segments are provided on the core whereby upon axial displacement of the latter, the segments spread radially. The tube is thus widened and radially expanded by a kind of wedging action that is effective on segments spreading them in all radial outward directions on and from the inside of the tube.

Generally speaking, tubes and pipes of this type are made for different strengths in accordance with a generally accepted or used scale. Tubes are graded and classified accordingly. It has to be observed that occasionally materials are accidentally mixed up, i.e., sheets are used among others destined for making a different grade of tubing. The usual methods for testing the sheet metal, as well as for testing the welding seam, involves X-ray or ultrasonic techniques. These methods are well suited for discovering localized defects, but they are not adequate for discovering the employment of the wrong material, such as a different grade of sheet metal stock that has been mixed with others. Therefore, in the past, the sized and otherwise completed tubes has been subjected to a pressure test to check on consistence of grading. That test, of course, required a separate step in the overall manufacturing sequence. Moreover, a meaningful test for large pipes requires considerable amount of equipment, and is expensive accordingly.

Such a pressure test uses hydrostatics whereby the generated pressure is sufficiently high to come close to the minimum yield point of stress for the particular grade. Lower grade tubing (having lower yield point) are readily detected during this test. However, that detection requires close attention by the people running the test. Lacking that may readily lead to explosive rupture of a low grade tube with more or less disastrous consequences. On the other hand, a tube whose strength is higher than allocated to the particular grade remains undetected.

It is sometimes required, that pipes are spot checked in that a ring section is severed from the tubing as a test sample and, possibly, destructively tested, including absolute tests of its strength. These tests include detection of the actual yield point of the sample, and expanders of the type outlined above have been used here. The spreading segments are equipped with means for measuring the radially effective force exerting strain on the segments. The utilization of samples is, however, also very expensive, as the samples have to be severed from the tube. Moreover, spot checking is not sufficient to detect, e.g., one or a few tubes for which the wrong grade material has been used. For detecting occasional employment of the wrong materials, all tubes made have to be tested, and that cannot be carried out through samples and spot checking.

SUMMARY DESCRIPTION OF THE INVENTION

It is an object of the present invention to provide method and facilities for testing each tube as to its grade so as to discover erroneously used materials including higher or lower grades than the grade desired in each instance. It is another object of the invention to provide for novel mechanical tube expanding technique to combine sizing with measurement of yield point.

In accordance with the preferred embodiment of the present invention, a tube expander is used having basically the known elements of a pyramid-shaped cone which, upon axial displacement, displaces expander segments radially. The axial displacement of the cone and the reaction of the tube against wedging as effective on the segments proportionally to the expanding and widening force as exerted, are measured during sizing, and both measurements are fed to a two-coordinate type plotter. The resulting plot is then used as a basis for finding the yield point. It was found, that the resulting plot permits immediate detection of the wrong grade of material without requiring an additional pressure test or any destructive analysis. The wrong material is detected right during that sizing process, by detecting specifically the reaction of the sizing tool to the expanding process. Specifically, the axial exterior of the segments is strain-gauged as resulting from radial compression during widening.

It should be noted, that tube sizing and calibrating is carried out at relatively high expansion speeds, so that the measurement is not carried out under quasi-stationary conditions, which usually prevail and are inherent in stress-strain diagrams. Therefore, the accuracy of measurement, particularly for obtaining indication of yield point, may not be sufficient for an absolute determination within the requirements made occasionally otherwise in material analysis. However, the detection of wrong grades is readily possible with this method and the results are sufficiently reproducible and comparable from tube to tube of the same grade, so that the equipment used can readily be calibrated and the wrong grades can, in fact, be detected. It should be noted that the tube expander is preferably driven at high but constant speed so that the conditions under which sequential expansions are carried out are reproducible as such, and meaningful calibration can be made in advance on that basis.

The method in accordance with the present invention is preferably carried out by means of a tube expander whose tapered, wedging action core is driven hydraulically, and at least one segment is equipment with expansion measuring transducing means, such as a wire strain gauge for ascertaining radial pressure force as acting in and through the segment during widening and as balanced in each instant by the strain reaction of the tube as it is being widened. The hydraulic displacement drive operates preferably with two speeds. One speed is used for sizing proper and for the running supervision of production. The other speed has been calibrated or otherwise standardized for obtaining a specific low expansion speed of the tube material, so that the expander can be used also for stress-analysis of sample tube sections or the like. Such test to be carried out at higher degree of accuracy. A two-coordinate plotter is connected to transducing or pick-up means for providing representation of core speed as well as to the expansion or extension measuring transducer or transducers. The two representations drive the plotter in two different directions and the resulting plot is sufficient to detect wrong grade of material if, for example, non-alloyed steel pipes are widened by about 1 percent, even if the widening is carried out at a high speed.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates a longitudinal section view through a mechanical tube expander improved in accordance with the preferred embodiment of the invention.

Proceeding now to the detailed description of the drawings, the FIGURE shows a tube expander as working on a tube 9. The expander proper is comprised of a pyramid shaped core 6, and plural segments 5 are annularly arranged on and around the core. The core has taper towards the left, providing wedging action on the segments when axially displaced. A housing 3 has an abutment and stop portion 13 inhibiting axial movement and displacement of segments 5 when the core 6 is displaced towards the left, thereby spreading or tending to spread the segments 5 radially.

Housing or casing 3 is provided to receive part of a rod 4 which carries the core 6; the core is bolted to the rod. The left-hand end of rod 4 is constructed to carry a piston 2, which is displaceably disposed in a piston chamber 1. The piston chamber 1 is bi-parted by the piston, and both portions can be subjected to hydraulic pressure or discharge, so that the piston can be moved to the left or the right as required. The hydraulics involved in the piston drive is shown only schematically as "Drive Control" and is conventional. However, it should be mentioned, that preferably the drive permits piston 2 to be displaced at two different operating speeds for moving core 6 to the left, i.e., during segment spreading action.

Casing 3, including cylinder 1, constitutes an outrigger-like extension of a stand for a roller track or the like, which moves the pipe or tube 9 to be expanded into the operating range of the expander.

Before tube 9 has been placed into working position, piston 2 has been shifted to the right so that the segments 5 are not radially extended. Next, a tube 9 is telescoped over the expander as illustrated and now the piston 2 is driven to the left. Accordingly, core 6 wedges the segments apart and displaces them radially to expand a section of the tube to the desired degree. Subsequently, the piston 2 is returned to the right, and segments 5 will recede radially as the taper of core 6 displaces to the right. The tube is shifted further (to the left) or is replaced by another one for the next working cycle. In other words, the same tube may be widened axial section by axial section, or an end portion only is widened. These operations are carried out with each tube and as part of the manufacturing and tube making process.

In view of the geometry involved, and here particularly in view of accurate predetermination of the taper angle of core 6, axial displacement of the assembly 2-4-6 is readily translatable into radial displacement of the segments 5, so that determination of one determines the other. As indicated by double arrow 10, the axial displacement of piston 2 in either direction is determined by a transducer, for example, of the electromagnetic variety determining the position of the piston in chamber 1.

Alternatively, transducer means or pick-up means may be spaced along casing 3 or in the casing wall with suitable markings (such as magnetic indicators or the like) provided on rod 4 so as to ascertain the axial position of the assembly 2-4-6 in representation of the axial positon of core 6 in particular, which representation, in turn, indicates the radial, expanding position of segments 5.

The displacement, i.e., position of the assembly 2-4-6, is a first measuring value as provided by transducer 10, and a representative signal is derived therefrom and fed to the driver for one coordinate direction of the plotter in a plotting instrument 7. The plotter thus moves in that one coordinate direction of the plotter in faithful representation of the axial displacement of assembly 2-4-6 and that, in turn, is a representation of the radial portion and displacement of segments 5 in each instant.

The tube 9 reacts against and resists widening and expansion. The reaction and resistance depends on the strength of the material of which the tube is made. This resistance of the tube against expansive deformation is effective as force acting against the segments 5. That reaction force balances the force which is transmitted by segments from core 6 to the tube. As a consequence, the strain reaction of the tube acts as compression force in the segments. The radial compression of the segments can be picked up by a strain gauge 8.

Transducer 8 is, for example, a wire or resistive strain gauge mounted to one of the segments 5 and responding to axial expansion of the one segment during radial compression, and providing an electrical signal which, through proper calibration, is representative of the resistance of the tube against expansion by the segments. That electrical signal drives the plotter in instrument 7 along the second coordinate thereof; transverse to the first coordinate.

As a consequence of the operation above, a stress-extension/deformation diagram is produced which is amenable to calibration. This will be particularly so if the high speed of piston operation during expanding is nevertheless constant, at least sufficiently so, so that similar tubes do produce similar diagrams and plots. The grade of the tube employed is revealed by the slope of the resulting plot within the elastic limit up to the beginning of plastic deformation and minimum yield point.

The equipment as described was developed primarily for running supervision of tube production to detect incorrect grades. However, the same equipment and method can be used for more sophisticated testing, using special pipe sections on samples cut off tubes as was done in the past.

The measurements carried out as running supervision of production occur during the expanding process as described. That process requires particular operation of the expanding tool and the high speed of piston and core advance is determined practically exclusively by the conditions and requirements for the expansion. The piston-cylinder arrangement is controlled accordingly and the control involves primarily pressure and flow speed of the hydraulic medium that drives piston 2 for obtaining high speed of segment spreading and tube expansion.

The situation is different when the expander is used just for testing a sample. Accordingly, the expander will be driven at a different, constant speed, lower than for normal expander operation and resulting in a particular speed for the test expansion. Nevertheless, the same transducers and plotter (or at least the same type of plotter) can be used here, when the test is conducted under quasi-stationary conditions as far as the elastic reactions is concerned.

The invention is not limited to the embodiments described above but all changes and modifications thereof not constituting departures from the spirit and scope of the invention are intended to be included.

We claim:

1. Method of testing tubes during sizing by means of a mechanical tube expander having a pyramid-like core and segments on the core, whereby the segments are spread radially upon axial displacement of the core for widening and sizing a tube, comprising:

detecting the axial displacement of the core in representation of radial displacement of the segments and providing a first signal representative thereof;

measuring the compressive force exerted by the expanding tube during the sizing against the segments as resistance of the tube against widening and radial expansion by operation of the segments as radially spread and providing a second signal representative of said compressive force; and driving a two-coordinate plotter by the first and second signals to obtain a diagram representing the compressive force during the sizing operation, from which for unalloyed tubes expanded by about 1% of their diameter, indication of the minimum yield point can be ascertained.

2. In a method as in claim 1, wherein the measuring step includes detecting the axial extension of a segment when radially compressed by reaction of the tube and its resistance against radial widening and expansion.

3. In a method as in claim 1, wherein the tube expander is driven by a constant speed during operation of spreading.

4. Apparatus for testing tubes, sized by means of
   a mechanical tube expander having a pyramid-like core and segments on the core, whereby the segments are spread radially upon axial displacement of the core for widening and sizing tubes, comprising:

first means for detecting the axial displacement of the core in representation of radial displacement of the segments and providing a first signal representative thereof;

second means for measuring the compressive force exerted by the expanding tube during sizing against the segments as the tube resists widening and radial expansion by operation of the tube as effective on the radially spreading segments, and providing a second signal representative of said compressive force; and a two-coordinate plotter connected to be driven by the first and second signals to obtain a diagram, representing the compressive force during the sizing operation, from which for unalloyed tubes, expanded by about 1 percent of their diameter, indication of the minimum yield point can be ascertained.

5. Apparatus as in claim 4, wherein the expander includes a hydraulic drive with piston and cylinder, the first means being responsive to displacement of the piston in the cylinder.

6. Apparatus as in claim 4, wherein the second means includes a wire strain gauge on one of the segments.

7. Apparatus as in claim 4, wherein the expander includes a drive that can drive the expander core by two different, predetermined speeds.

* * * * *